(12) United States Patent
LeLeannec et al.

(10) Patent No.: US 11,490,112 B2
(45) Date of Patent: Nov. 1, 2022

(54) MOTION VECTOR PREDICTOR CANDIDATES ORDERING IN MERGE LIST

(71) Applicant: InterDigital VC Holdings, Inc., Wilmington, DE (US)

(72) Inventors: Fabrice LeLeannec, Cesson-Sevigne (FR); Antoine Robert, Cesson-Sevigne (FR); Tangi Poirier, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/276,819

(22) PCT Filed: Nov. 25, 2019

(86) PCT No.: PCT/US2019/062975
§ 371 (c)(1),
(2) Date: Mar. 16, 2021

(87) PCT Pub. No.: WO2020/112620
PCT Pub. Date: Jun. 4, 2020

(65) Prior Publication Data
US 2021/0266586 A1 Aug. 26, 2021

(30) Foreign Application Priority Data
Nov. 29, 2018 (EP) .................................. 18306584

(51) Int. Cl.
H04N 19/172 (2014.01)
H04N 19/176 (2014.01)
H04N 19/517 (2014.01)

(52) U.S. Cl.
CPC ......... *H04N 19/517* (2014.11); *H04N 19/172* (2014.11); *H04N 19/176* (2014.11)

(58) Field of Classification Search
None
See application file for complete search history.

(56) References Cited

U.S. PATENT DOCUMENTS

| | | | | |
|---|---|---|---|---|
| 6,462,791 B1 * | 10/2002 | Zhu | ........................ | H04N 19/82 375/E7.111 |
| 11,070,797 B2 * | 7/2021 | Park | ..................... | H04N 19/159 |
| 11,082,702 B2 * | 8/2021 | Park | ....................... | H04N 19/10 |
| 11,159,817 B2 * | 10/2021 | Zhang | .................... | H04N 19/70 |
| 11,172,196 B2 * | 11/2021 | Zhang | .................... | H04N 19/52 |
| 11,197,007 B2 * | 12/2021 | Zhang | .................. | H04N 19/176 |
| 11,202,081 B2 * | 12/2021 | Zhang | .................. | H04N 19/119 |

(Continued)

OTHER PUBLICATIONS

Anonymous, "High Efficiency Video Coding", Series H: Audiovisual and Multimedia Systems, Infrastructure of audiovisual services—Coding of moving video, ITU-T, H.265, pp. 1-636, Apr. 2015.

(Continued)

*Primary Examiner* — Mohammad J Rahman
(74) *Attorney, Agent, or Firm* — Xiaoan Lu

(57) ABSTRACT

Different implementations are described; particularly implementations for video encoding and decoding using merge lists comprising history-based motion vector predictor candidates and averaged motion vector predictor candidates. The method comprises: determining for a current block of the picture one or more history-based motion vector predictor candidates using motion information of blocks preceding the current block; determining for the current block one or more averaged motion vector predictor candidates by averaging a pair of motion vector predictor candidates in a list of motion vector predictor candidates, wherein the motion vector predictor candidates in the list are formed using motion information of blocks spatially and/or temporally surrounding the current block; and inserting one or more of the averaged motion vector predictor candidates before one or more of the history-based motion vector predictor candidates in the list of motion vector predictor candidates.

20 Claims, 19 Drawing Sheets

(56) References Cited

U.S. PATENT DOCUMENTS

| | | | |
|---|---|---|---|
| 2012/0162454 A1* | 6/2012 | Park | H04N 5/145 |
| | | | 348/208.6 |
| 2015/0016713 A1* | 1/2015 | Mori | G06T 7/254 |
| | | | 382/154 |
| 2015/0334397 A1* | 11/2015 | Pun | H04N 19/126 |
| | | | 375/240.03 |
| 2019/0124350 A1* | 4/2019 | Thirumalai | H04N 19/537 |
| 2021/0014520 A1* | 1/2021 | Zhang | H04N 19/513 |
| 2021/0037256 A1* | 2/2021 | Zhang | H04N 19/577 |
| 2021/0258569 A1* | 8/2021 | Chen | H04N 19/139 |
| 2022/0030268 A1* | 1/2022 | Le Leannec | H04N 19/176 |

OTHER PUBLICATIONS

Hsiao et al., "CE4.4.12:Pairwise average candidates", Document: JVET-L0090-v2, Joint Video Experts Team (JVET) of ITU-T SG 16 WP 3 and ISO/IEC JTC 1/SC 29/WG 11, 12th Meeting: Macaco, CN, pp. 1-18, Oct. 3-12, 2018.

Lee et al., "CE4-related: Composite merge candidate", Document: JVET-L0144_r2, Joint Video Experts Team (JVET) of ITU-T SG 16 WP 3 and ISO/IEC JTC 1/SC 29/WG 11, 12th Meeting: Macau, CN, pp. 1-4, Oct. 8-12, 2018.

Zhang et al: "CE4: History-based Motion Vector Prediction (Test 4.4.7)", Document: JVET-L0266-v2, Joint Video Experts Team (JVET) of ITU-T SG 16 WP 3 and ISO/IEC JTC 1/SC 29/WG 11, 12th Meeting: Macao, CN, pp. 1-6, Oct. 3-12, 2018.

Li et al., "CE4—ranking based spatial merge candidate list for inter prediction (Test CE4.4.14)", Document: JVET-L0318, Joint Video Experts Team (JVET) of ITU-T SG 16 WP 3 and ISO/IEC JTC 1/SC 29/WG 11, 12 Meeting: Macao, CN, pp. 1-4, Oct. 3-12, 2018.

Bross et al., "Versatile Video Coding (Draft 3)", Document: JVET-L1001-v2, Joint Video Experts Team (JVET) of ITU-T SG 16 WP 3 and ISO/IEC JTC 1/SC 29/WG 11, 12th Meeting: Macao, pp. 1-168, CN, Oct. 3-12, 2018.

* cited by examiner

MOTION VECTOR PREDICTOR CANDIDATES ORDERING IN MERGE LIST

This application claims the benefit, under 35 U.S.C. § 371 of International Application No. PCT/US2019/062975, filed Nov. 25, 2019, which was published on Jun. 4, 2020, which claims the benefit of European Patent Application No. EP18306584.6 Nov. 29, 2018.

TECHNICAL FIELD

This application is in the field of video compression, and it aims at improved compression efficiency compared to existing video compression systems.

BACKGROUND

For the compression of video data, block-shaped regions of the pictures are coded using inter-picture prediction to exploit temporal redundancy between different pictures of the video source signal or using intra-picture prediction to exploit spatial redundancy in a single picture of the source signal. For this purpose, depending on the used compression standard, a variety of block sizes in the picture may be specified. The prediction residual is then further compressed using a transform to remove correlation inside the residuals before it is quantized and finally even more compressed using entropy coding, also called residual coding.

In the HEVC video compression standard (see "ITU-T H.265 TELECOMMUNICATION STANDARDIZATION SECTOR OF ITU (10/2014), SERIES H: AUDIOVISUAL AND MULTIMEDIA SYSTEMS, Infrastructure of audiovisual services—Coding of moving video, High efficiency video coding, Recommendation ITU-T H.265"), one motion vector (MV) is assigned to uni-predictional Prediction Units (PUs), and a pair of motion vectors is assigned to bi-predictional PUs for motion compensated temporal prediction of the considered PU. Two modes are employed in HEVC to encode the motion data. They are respectively called AMVP (Adaptive Motion Vector Prediction) and Merge.

AMVP basically consists in signaling the reference picture(s) used to predict the current PU, a Motion Vector Predictor index (taken among a list of two predictors) and a motion vector difference. The merge mode consists in signaling and decoding the index of some motion data collected in a list of motion data predictors. This merge list is made of five candidates and is constructed the same way on the decoder and the on encode sides. The merge list typically contains the motion information associated to some spatial and temporal surrounding blocks, available in their decoded state when the current PU is being processed.

Furthermore, in VTM-3 (see "Versatile Video Coding (Draft 3)", B. Bross, J. Chen, S. Liu, document JVET-L1001, Macao, October 2018) two types of merge candidates have been adopted, the so-called history-based motion vector predictors (HMVP) and pairwise average candidates.

SUMMARY

According to an aspect of the present disclosure, a method for encoding and/or decoding a picture is disclosed. Such a method comprises:

determining for a current block of the picture one or more history-based motion vector predictor candidates using motion information of blocks preceding the current block;

determining for the current block one or more averaged motion vector predictor candidates by averaging a pair of motion vector predictor candidates in a list of motion vector predictor candidates, wherein the motion vector predictor candidates in the list are formed using motion information of blocks spatially and/or temporally surrounding the current block; and inserting one or more of the averaged motion vector predictor candidates before one or more of the history-based motion vector predictor candidates in the list of motion vector predictor candidates.

According to another aspect of the present disclosure, an apparatus for encoding and/or decoding a picture is disclosed. Such an apparatus comprises one or more processors, wherein said one or more processors are configured to:

determine for a current block of the picture one or more history-based motion vector predictor candidates using motion information of blocks preceding the current block;

determine for the current block one or more averaged motion vector predictor candidates by averaging a pair of motion vector predictor candidates in a list of motion vector predictor candidates, wherein the motion vector predictor candidates in the list are formed using motion information of blocks spatially and/or temporally surrounding the current block; and insert one or more of the averaged motion vector predictor candidates before one or more of the history-based motion vector predictor candidates in the list of motion vector predictor candidates.

According to another aspect of the present disclosure, an apparatus for encoding and/or decoding a picture is disclosed which comprises:

means for determining for a current block of the picture one or more history-based motion vector predictor candidates using motion information of blocks preceding the current block;

means for determining for the current block one or more averaged motion vector predictor candidates by averaging a pair of motion vector predictor candidates in a list of motion vector predictor candidates, wherein the motion vector predictor candidates in the list are formed using motion information of blocks spatially and/or temporally surrounding the current block; and means for inserting one or more of the averaged motion vector predictor candidates before one or more of the history-based motion vector predictor candidates in the list of motion vector predictor candidates.

According to an aspect of the present disclosure, a method for encoding and/or decoding a picture is disclosed. Such a method comprises:

determining for a current block of the picture one or more history-based motion vector predictor candidates using motion information of blocks preceding the current block;

determining for the current block one or more averaged motion vector predictor candidates and/or one or more combined motion vector predictor candidates; and inserting the determined motion vector predictor candidates in a list of motion vector predictor candidates depending on the temporal structure of reference frames for the current block.

According to another aspect of the present disclosure, an apparatus for encoding and/or decoding a picture is disclosed. Such an apparatus comprises one or more processors, wherein said one or more processors are configured to:

determine for a current block of the picture one or more history-based motion vector predictor candidates using motion information of blocks preceding the current block;

determine for the current block one or more averaged motion vector predictor candidates and/or one or more combined motion vector predictor candidates; and insert the determined motion vector predictor candidates in a list of motion vector predictor candidates depending on the temporal structure of reference frames for the current block.

According to another aspect of the present disclosure, an apparatus for encoding and/or decoding a picture is disclosed which comprises:

means for determining for a current block of the picture one or more history-based motion vector predictor candidates using motion information of blocks preceding the current block;

means for determining for the current block one or more averaged motion vector predictor candidates and/or one or more combined motion vector predictor candidates; and means for inserting the determined motion vector predictor candidates in a list of motion vector predictor candidates depending on the temporal structure of reference frames for the current block.

The present disclosure also provides a computer program product including instructions, which, when executed by a computer, cause the computer to carry out the methods described. The present disclosure also provides a non-transitory computer readable medium storing executable program instructions to cause a computer executing the instructions to perform any of the methods described. The present disclosure also provides a signal comprising data generated according to any of the methods described. The present disclosure also provides a bitstream, formatted to include syntax elements and encoded image information in accordance with any of the methods described.

The present disclosure also provides a device comprising:
an apparatus as described; and
at least one of (i) an antenna configured to receive a signal, the signal including data representative of the image information, (ii) a band limiter configured to limit the received signal to a band of frequencies that includes the data representative of the image information, and (iii) a display configured to display an image from the image information.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures

It should be understood that the drawings are for purposes of illustrating examples of various aspects and embodiments and are not necessarily the only possible configurations. Throughout the various figures, like reference designators refer to the same or similar features.

DETAILED DESCRIPTION

For clarity of description, the following description will describe aspects with reference to embodiments involving video compression technology such as, for example, HEVC and/or VVC/H.266. However, the described aspects are applicable to other video processing technologies and standards.

Figure 1:
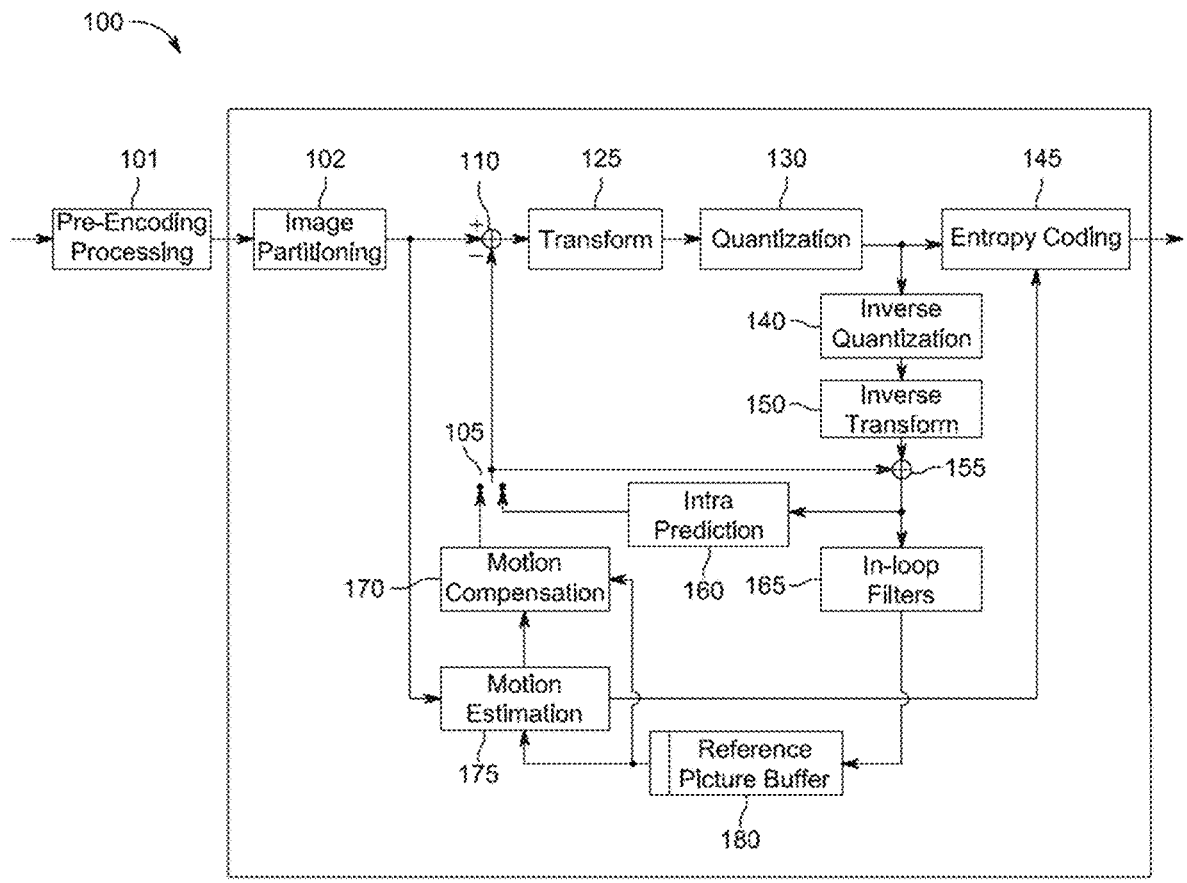
FIG. 1 illustrates a block diagram of an example of a generic video compression scheme.

FIG. 1 illustrates an example video encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

To encode a video sequence with one or more pictures, a picture is partitioned (102), for example, into one or more slices where each slice can include one or more slice segments. In HEVC, a slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (Y, Cb, Cr, or monochrome), syntax elements, and prediction data that are associated with the blocks (e.g., motion vectors).

In the encoder 100, a picture is encoded by the encoder elements as described below. The picture to be encoded is processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

Figure 2:
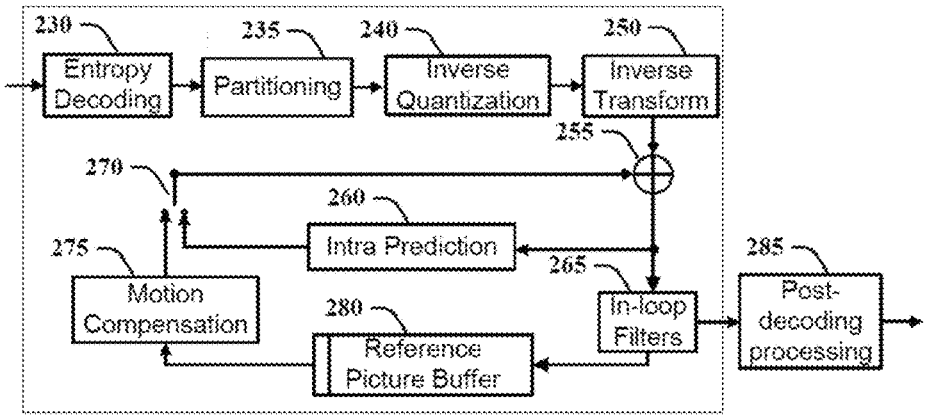
FIG. 2 illustrates a block diagram of an example of a generic video decompression scheme.

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

The present application proposes an adaptation of a list of motion vector predictors, in an encoder and decoder, such as those illustrated in FIGS. 1 and 2, respectively, which employ motion compensated temporal prediction to exploit the redundancy that exists between successive pictures of a video sequence.

In the HEVC video compression standard or technologies similar to HEVC motion vectors are associated to Prediction Units (PUs). A picture to be encoded or decoded is divided into so-called Coding Tree Units (CTUs), which are the basic units of coding, and a consecutive set of CTUs is grouped into a slice. A CTU usually comprises three Coding Tree Blocks (CTBs), a block for luminance samples and two blocks for chrominance samples, and associated syntax elements. The Coding Tree Units can be further split into Coding Units (CUs), which are the smallest coding elements for the prediction type decision, i.e. whether to perform inter-picture or intra-picture prediction. Finally, the Coding Units are further split into one or more Prediction Units (PUs).

Figure 3:
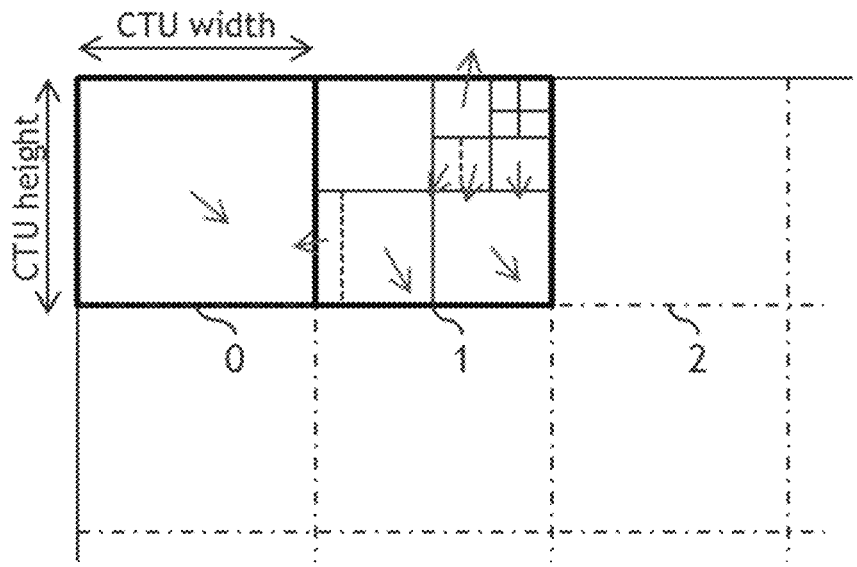
FIG. 3 illustrates some Coding Tree Units representing a compressed HEVC picture.

An example for a partitioning of a part of a picture into CTUs 0, 1, 2 is shown in FIG. 3. In the figure, the left CTU 0 is directly used as is while the CTU 1 to the right of it is partitioned into multiple smaller sections based on the signal characteristics of the picture region covered by the CTU. The arrows indicate the motion vectors of the respective section.

Figure 4:
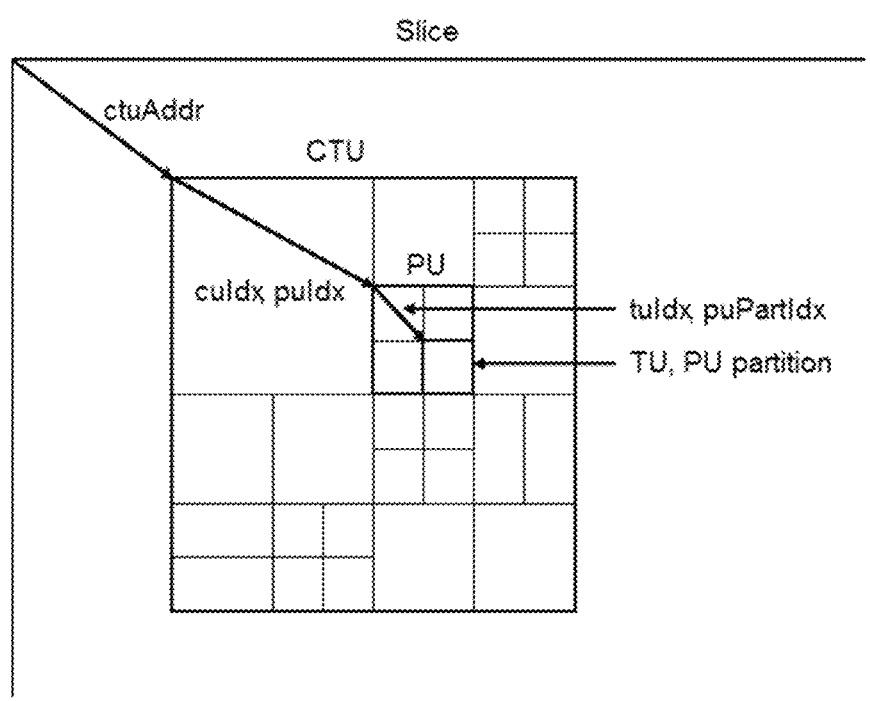
FIG. 4 illustrates the division of a Coding Tree Unit into Coding Units, Prediction Units and Transform Units.

A CTB is the root of a quadtree partitioning into Coding Blocks (CB), and a Coding Block may be partitioned into one or more Prediction Blocks (PB) and forms the root of a quadtree partitioning into Transform Blocks (TBs). A Transform Block (TB) larger than 4×4 is divided into 4×4 sub-blocks of quantized coefficients called Coefficient Groups (CG). Corresponding to the Coding Block, Prediction Block, and Transform Block, a Coding Unit (CU) includes the Prediction Units (PUs) and the tree-structured set of Transform Units (TUs). A PU includes the prediction information for all color components, and a TU includes residual coding syntax structure for each color component. The same prediction is applied to a prediction block (PB). The size of a CB, PB, and TB of the luma component applies to the corresponding CU, PU, and TU. An example for the division of a Coding Tree Unit into Coding Units, Prediction Units and Transform Units is shown in FIG. 4.

In the following, the proposed methods are described in detail. First, the general principle of the merge mode, pairwise average and History-based motion vector prediction candidates are described. Then, different embodiments for the construction of merge candidate lists including pairwise average and History-based motion vector prediction candidates are proposed.

The merge mode according to the HEVC standard consists in deriving the inter prediction information (also called motion information in the following) of a given prediction unit from a selected motion information predictor candidate. The motion information considered here includes all the inter prediction parameters of a PU, that is to say:

The uni-directional or bi-directional temporal prediction type;

The reference picture index within each reference picture list;

The motion vector(s).

Figure 5:
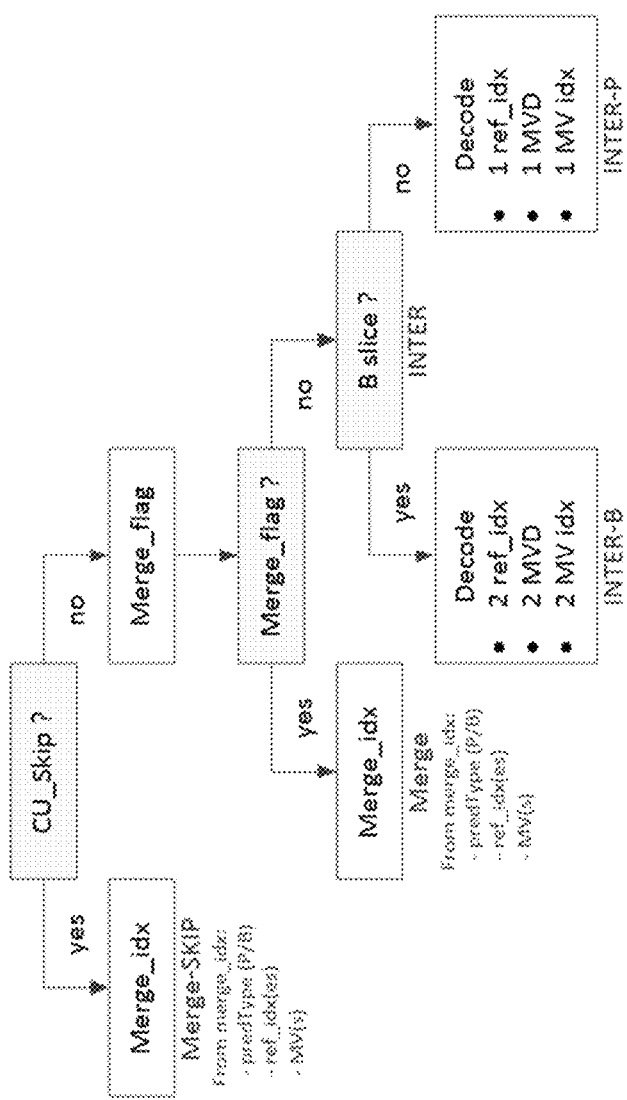
FIG. 5 illustrates the signaling of the inter prediction information according to the HEVC specification.

The coding and decoding of inter prediction information in HEVC is summarized in FIG. 5. As can be seen, the motion information coding/decodingis similar in the skip mode and in the merge mode. In these two modes, one single field is being signaled to make the decoder able to retrieve the motion information of a PU: the so-called merge index Merge_idx. The merge index indicates which Motion Vector predictor in the list of merge motion information predictors is used to derive the motion information of current PU. In the following, the list of motion information predictors is also called the merge list, or merge candidate list.

Moreover, a candidate motion information predictor is called a merge candidate.

Figure 6:
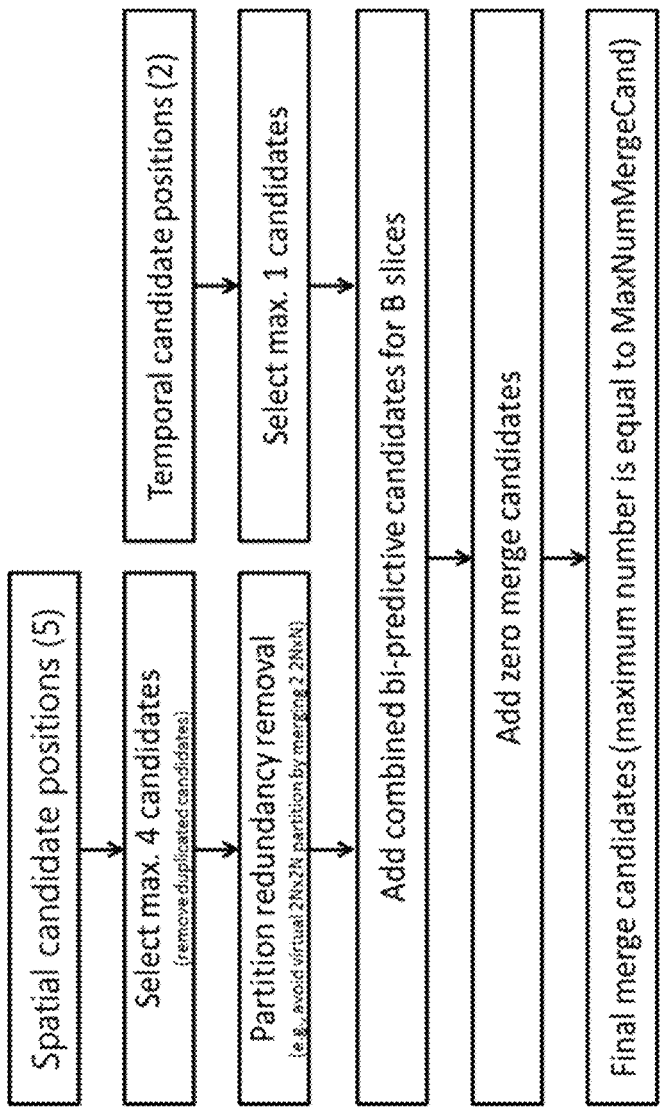
FIG. 6 illustrates the construction of the list of merge motion vector predictor candidates in HEVC.
Figures 7A, 7B:
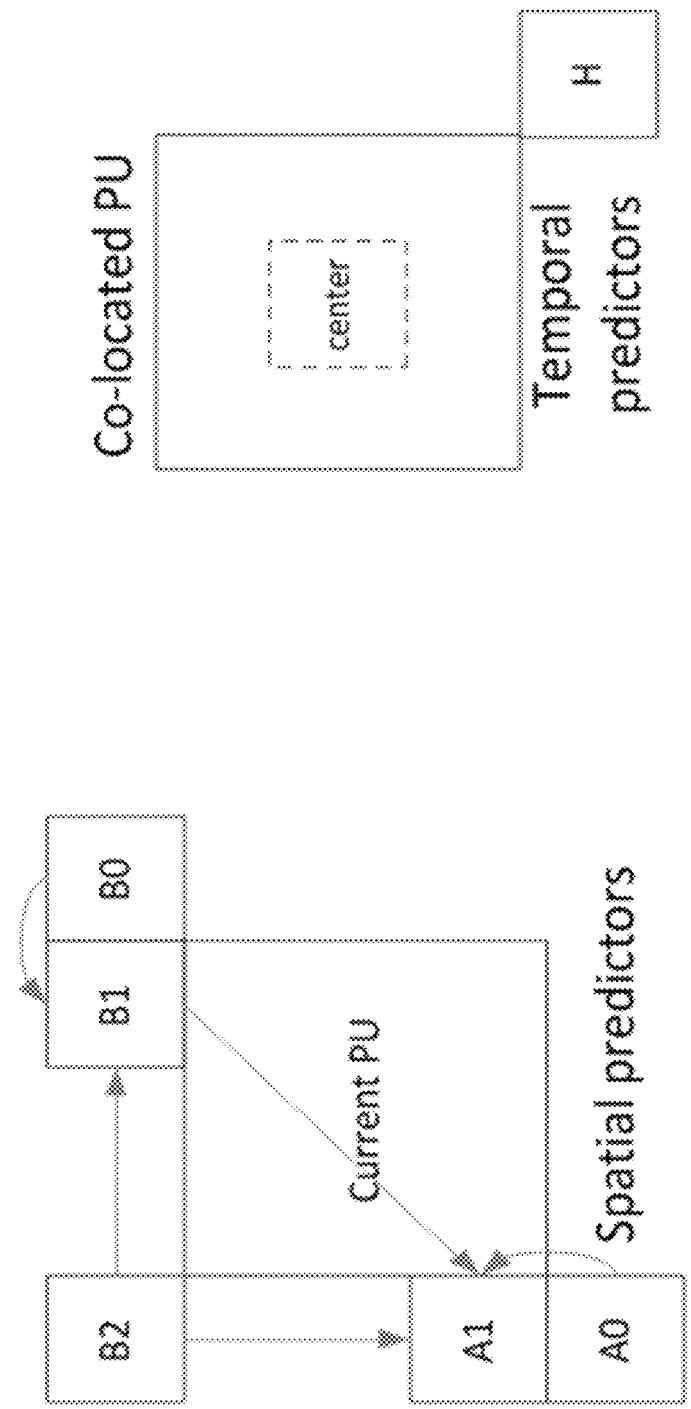
FIG. 7 illustrates positions of spatial (a) and temporal (b) motion vector predictors used in the merge mode in HEVC.

In HEVC, the merge candidate list is systematically made of 5 merge candidates. FIG. 6 illustrates how the merge list is constructed, both on the encoder and on the decoder sides. First, up to 5 spatial positions are considered to retrieve some potential candidates. They are visited according to the following order:

1—Left (A1)
2—Above (B1)
3—Above right (B0)
4—Left bottom (A0)
5—Above left (B2)

where the symbols A0, A1, B0, B1, B2 denote the spatial position shown in FIG. 7a.

A maximum of four spatial candidates being different from each other are selected. Furthermore, a temporal predictor denoted TMVP is selected, by considering the temporal motion information located at positions illustrated in FIG. 7b, i.e. position H, and then "center", if a candidate at position H in the considered reference picture is not available. A pruning process then takes place to ensure the selected set of spatial and temporal candidates does not contain redundant candidate.

Next, in the case of a B slice, candidates of another type are pushed to the merge list if it is not full: the so-called combined candidates. This consists in forming a candidate made of the motion information associated to one reference picture list (L0) from one candidate already present in the list, with the motion associated to the other reference picture list (L1) from another candidate already present in the merge list.

Finally, if the merge list is still not full, i.e. does not yet include 5 elements, zero motion vectors are pushed to the back of the merge list until it is full.

Figure 8:
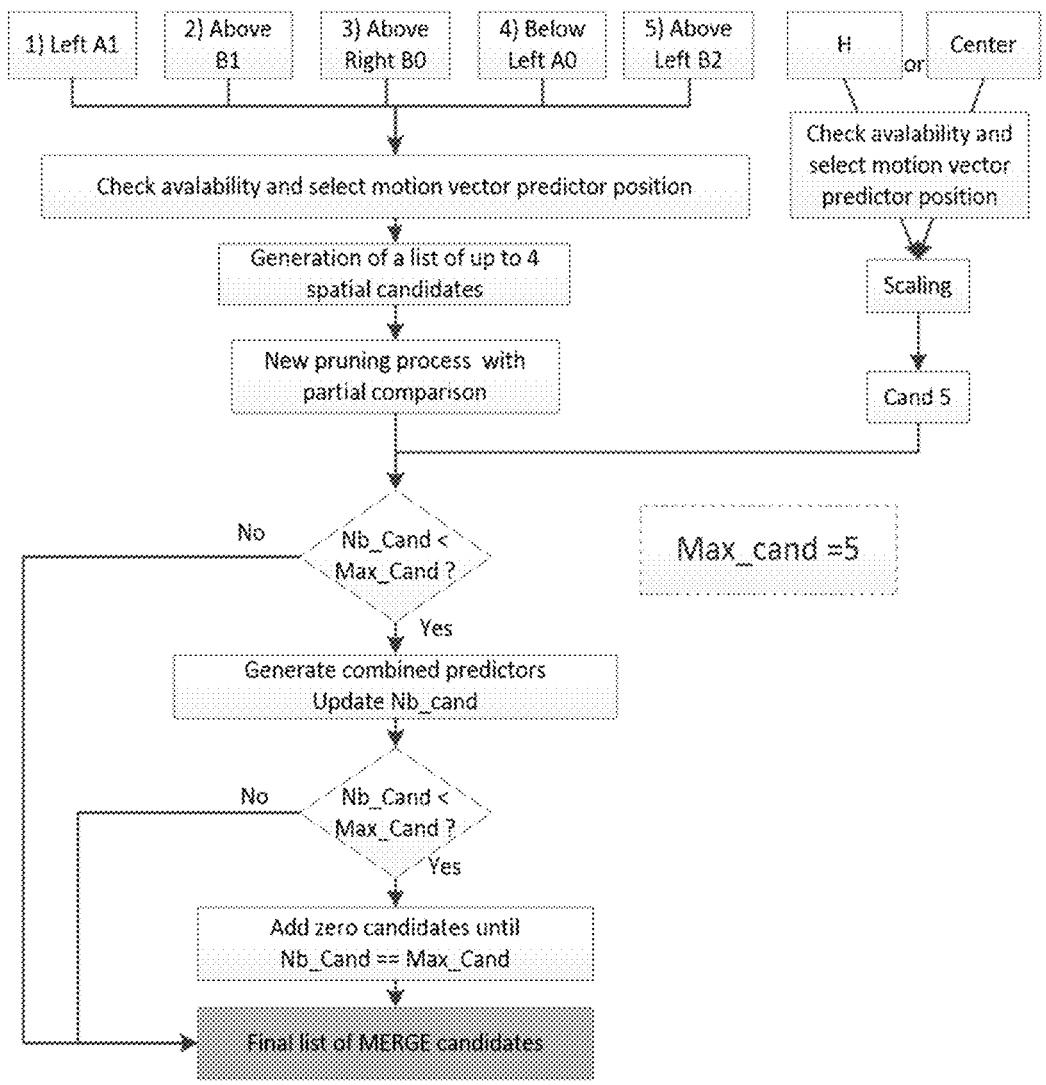
FIG. 8 illustrates the construction of the list of merge motion vector predictor candidates for the positions of spatial and temporal motion vector predictors shown in FIG. 6.

The overall process of the merge list construction in HEVC is detailed on the diagram of FIG. 8.

In JVET-L0090 (see JVET-L0090 "CE4.4.12: Pairwise average candidates", Y.-L. Hsiao, T.-D. Chuang, C.-Y. Chen, C.-W. Hsu, Y.-W. Huang, S.-M. Lei, Macao, October 2018), so-called pairwise average candidates are added to the merge candidate list, to improve the VTM-2 compression efficiency. These pairwise candidates are computed as follows. For each reference picture list, some pre-defined pairs of candidates are taken from the merge candidate list and are averaged. The merge list is taken in its current state when the pairwise candidates are being computed. A pairwise candidate is formed if one or two candidates are available for the considered reference picture list and at considered position in the merge candidate list. Up to six candidates are considered to enrich the merge candidate list.

A last new merge enhancement tool that is part of the draft VVC standard is called history-based motion vector prediction (JVET-L0266, see JVET-L0266 "CE4: History-based Motion Vector Prediction (Test 4.4.7)", L. Zhang, K. Zhang, H. Liu, Y. Wang, P. Zhao, D. Hong, Macao, October 2018).

Figure 9:
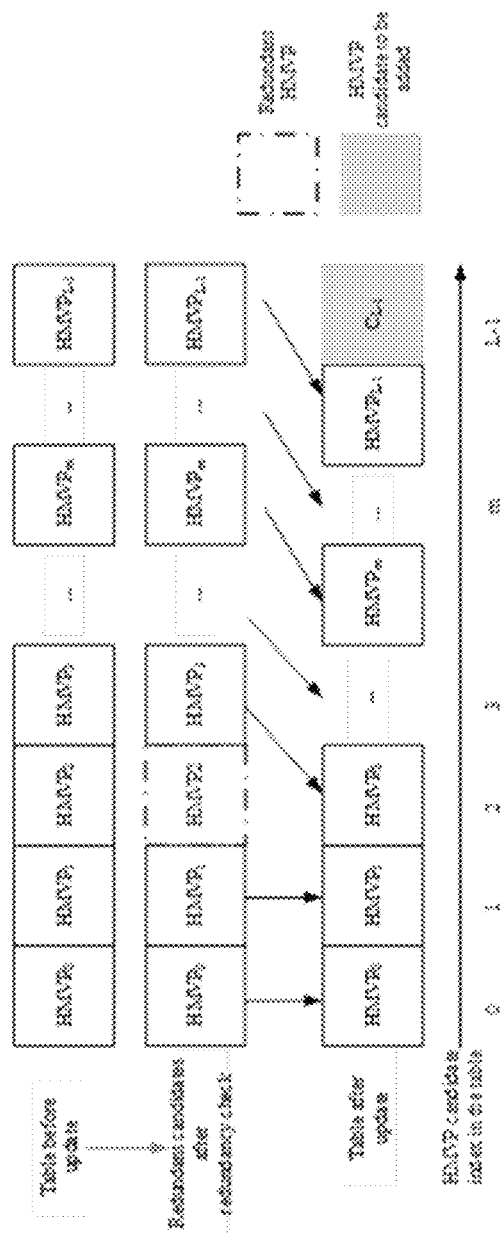
FIG. 9 illustrates an example of updating the table in a method using History-based Motion Vector Predictor candidates.

History-based motion vector prediction consists in maintaining a table made of multiple motion information used for the coding of blocks preceding the current block. Each time a non-affine inter block is coded, its associated motion data is added to the end of the table, as a new HMVP merge candidate. The maximum number of motion vector predictors in the HMVP table is 6, and past motion data is discarded from the table according to the FIFO (First-In-First-Out) rule. The management of the history-based buffer (table) of motion vector predictors is illustrated in FIG. 9.

Figure 10:
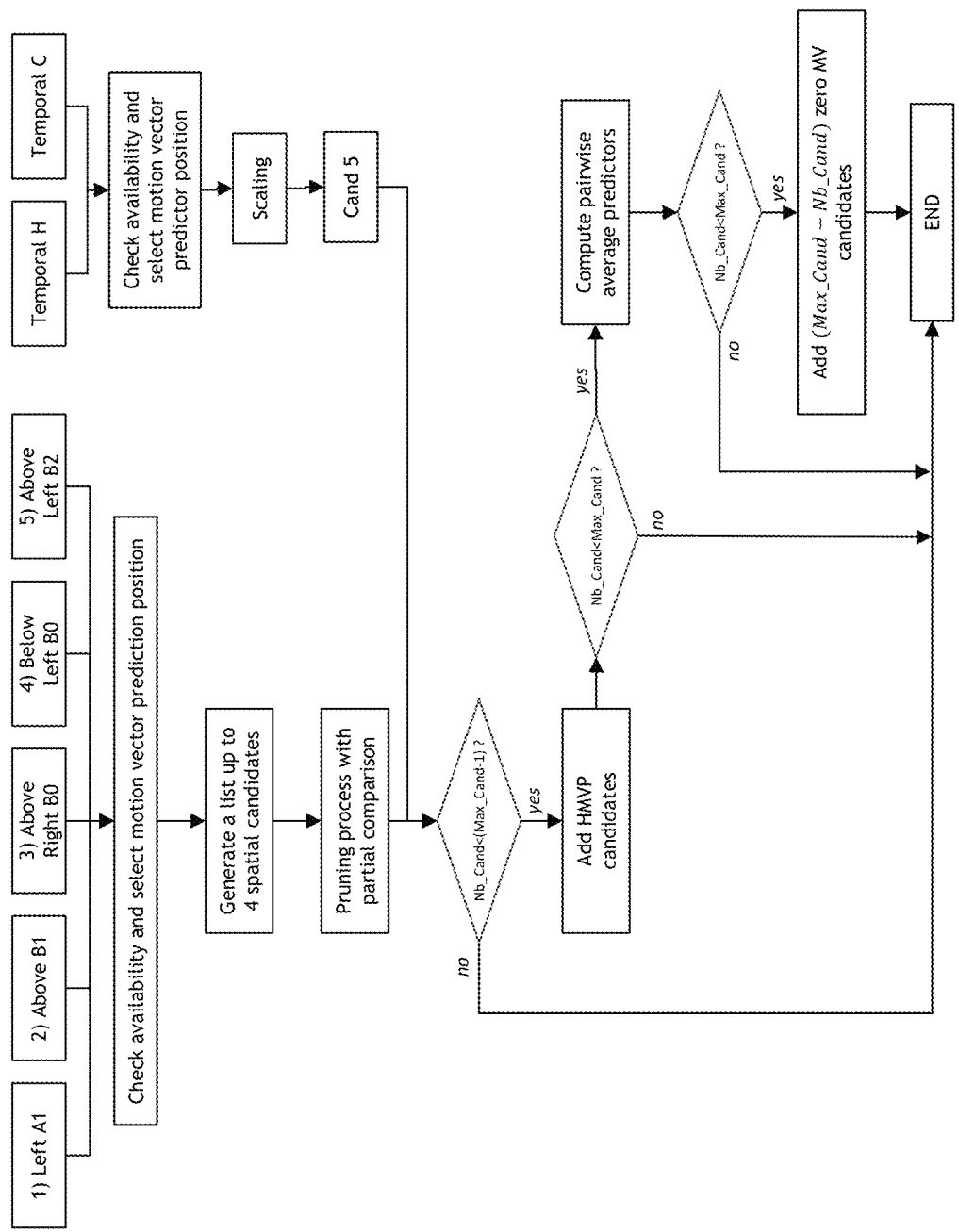
FIG. 10 illustrates a non-sub-block (or translational) merge candidate list construction according to VVC draft 3.

The construction of classical (or non-sub-block or translational, as opposed to affine or sub-block-based) merge list construction according to VVC Draft 3 is illustrated in FIG. 10. Here "classical" means the merge list used for translational motion compensated temporal prediction, where one motion vector is associated to a CU for each reference picture list.

The construction of the classical merge list is enriched compared to HEVC as follows. As can be seen in FIG. 10, the same spatial and temporal predictors are used during the first stage of the process. After the spatial and temporal MV predictors have been added, if the merge list contains at least 2 free places left, then the HMVP candidates are being added to the list. During this stage, one or more HMVP candidates are iteratively being pushed to the back of the candidate list. Once the number of remaining free places in the list has decreased to one, or when there is no more HMVP candidate available, this iterative HMVP filling step is stopped.

Next, if the list is still not full (i.e. the number of added candidates is less than the allowed maximum number of merge candidates), then some pairwise merge candidates are evaluated and added to the list. This stage consists in an iterative computation and pushing of pairwise candidates to the back of the merge candidate list. This iterative process is stopped when the merge candidate list is full, or no more pairwise candidate is available.

Finally, if the classical merge list is still not full, then it is filled with zero motion vectors.

Figure 11:
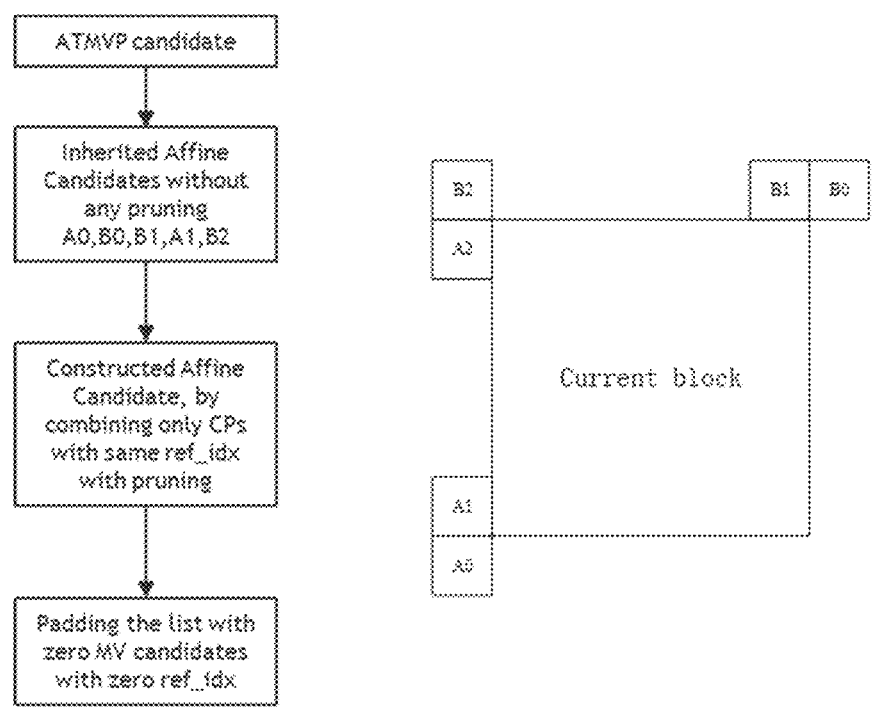
FIG. 11 illustrates the construction of the list of sub-block-based motion vector predictor candidates according to VTM-3.

The construction of the affine merge list as in the VVC draft 3 is illustrated in FIG. 11. The affine merge list gathers all merge MV predictors which involve a sub-block-based motion compensated temporal prediction. Thus, this includes the advanced temporal motion vector prediction (ATMVP) merge mode, and affine merge modes. Affine merge candidates stand for merge candidates from which a 4×4 block based affine motion field is derived for current CU and used in the temporal prediction of current CU.

ATMVP consists in temporally predicting one or more motion vectors of current block from an area in a reference picture, pointed to by a motion vector derived from a spatial neighboring block of current block.

As illustrated in FIG. 10, in VVC Draft 3, the HMVP merge candidates are inserted first in the merge list before the pairwise average candidates are inserted. Moreover, they are included in the merge candidate list if at least two free places are remaining in the merge list at the time the HMVP candidates are being considered. Indeed, before considering the HMVP candidates, the merge list construction process fills the list with spatial and temporal predictors if available.

It has been observed that this merge list organization may not be optimal from the coding efficiency viewpoint. Therefore, in the solution proposed in this application, some methods are proposed to order the HMVP and pairwise candidates in a rate distortion efficient way in the merge list, i.e. in a way that improves the coding efficiency over the existing codecs, e.g., the VTM-3. In particular, it has been noticed that depending on the maximum list size allowed (6, 8 or 10 max candidates), inserting the HMVP candidate ahead of pairwise candidates may not be optimal, in terms of coding efficiency.

Resulting from these observations, one basic principle of the disclosure is to put some pairwise candidate(s) before the HMVP candidates in the merge candidate list. Several embodiments are provided for this purpose and are detailed in the following.

Figure 12:
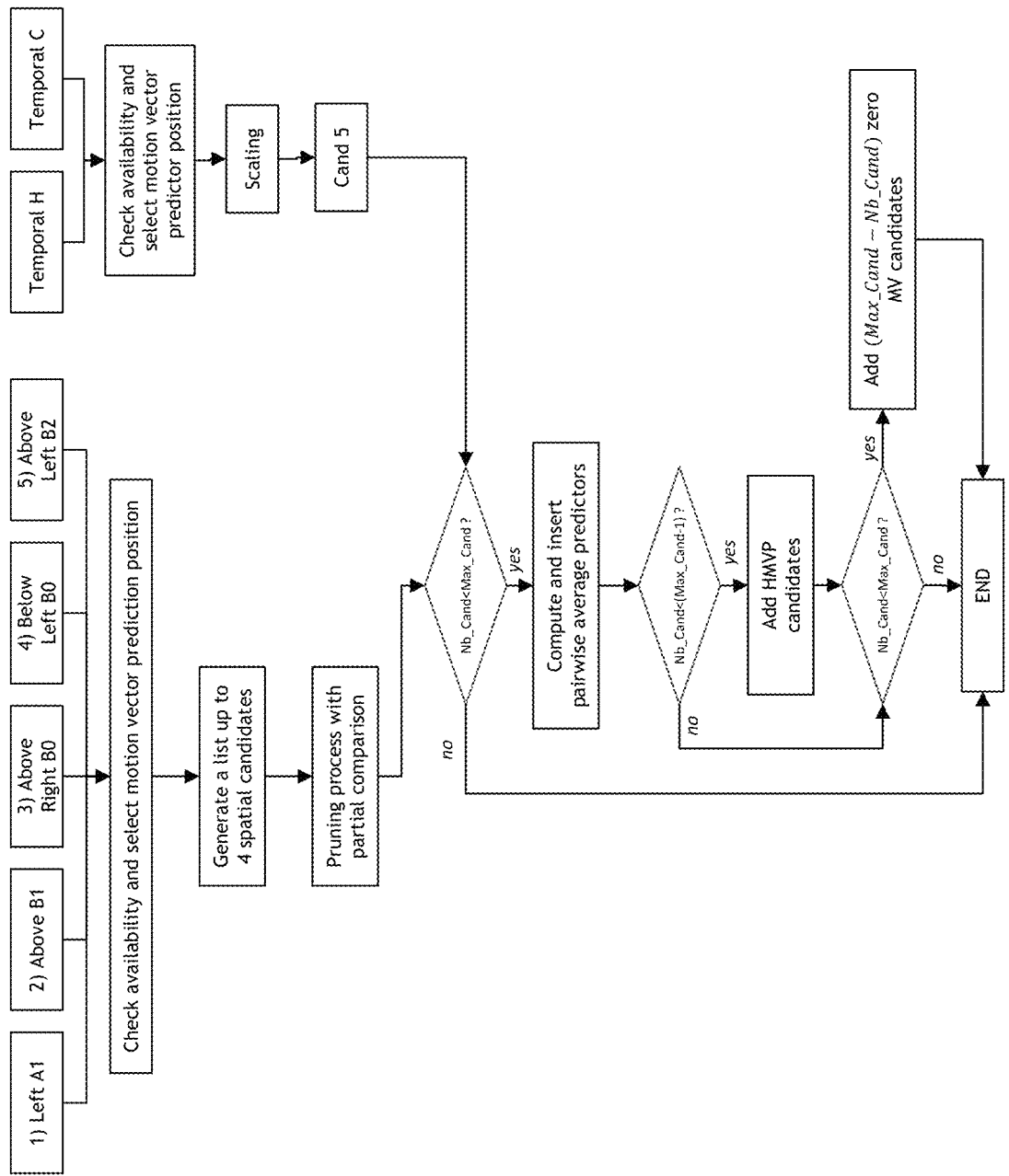
FIG. 12 illustrates a modified translational merge candidate list construction according to a first variant of a first embodiment.

According to the first embodiment, the pairwise average candidates are inserted before the HMVP candidates in the merge candidate list. The proposed process to construct the translational merge candidate list is given by FIG. 12. This process is performed both by the encoder and the decoder. As can be seen, the modified process consists in inverting the order in which pairwise average and HMVP merge candidates are put into the list.

Figure 13:
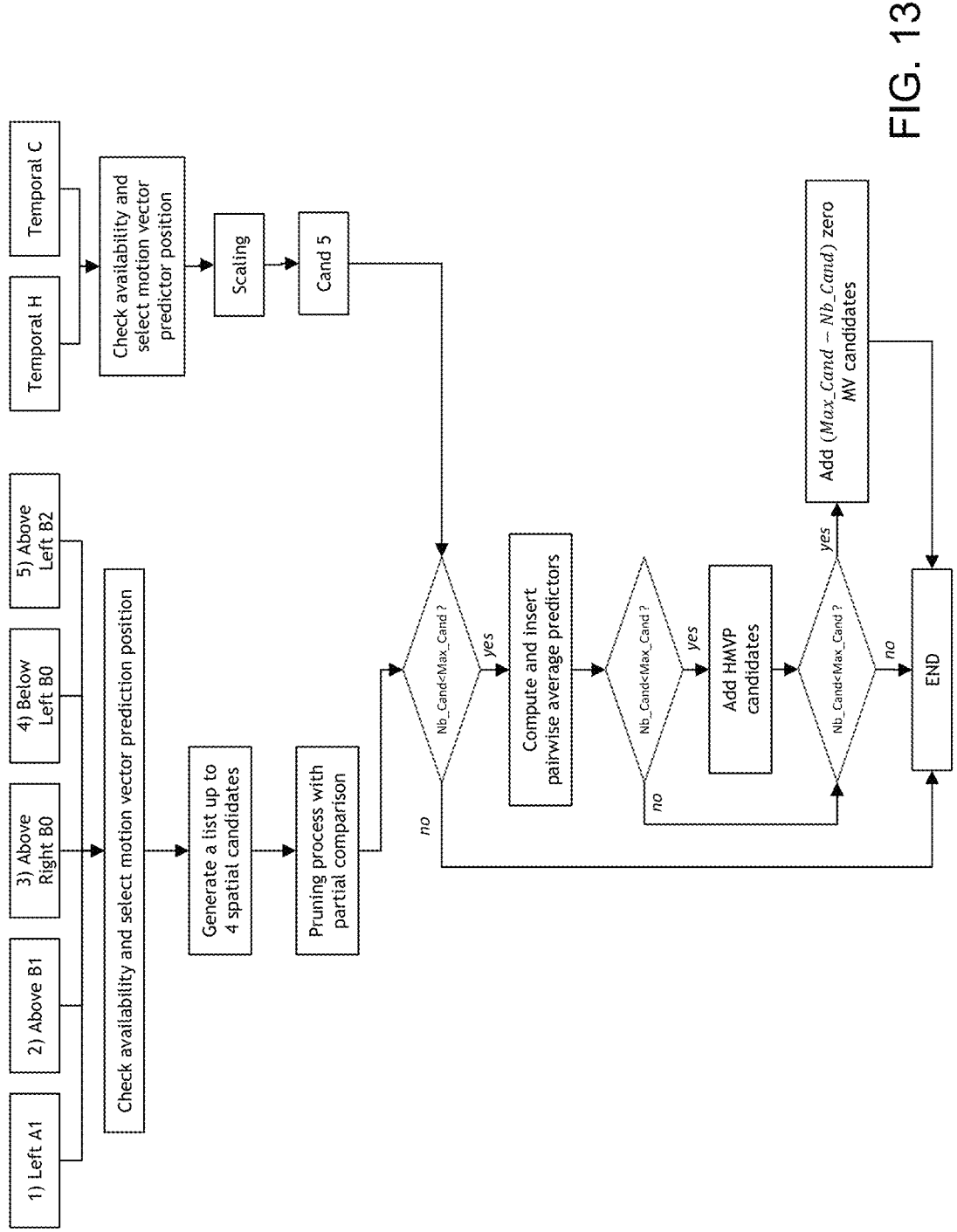
FIG. 13 illustrates a second variant of a first embodiment with a modified condition to insert History-based Motion Vector Predictors.

A further modified version of the proposed process is provided by FIG. 13. This variant is a further refined process compared to the previous one, where the condition to insert HMVP candidates into the list is modified. Here, HMVP candidates are inserted as soon as the merge list is not yet full. This modification is justified by the fact that pairwise candidates have already been computed and put to the list before considering HMVP candidates.

Figure 14:
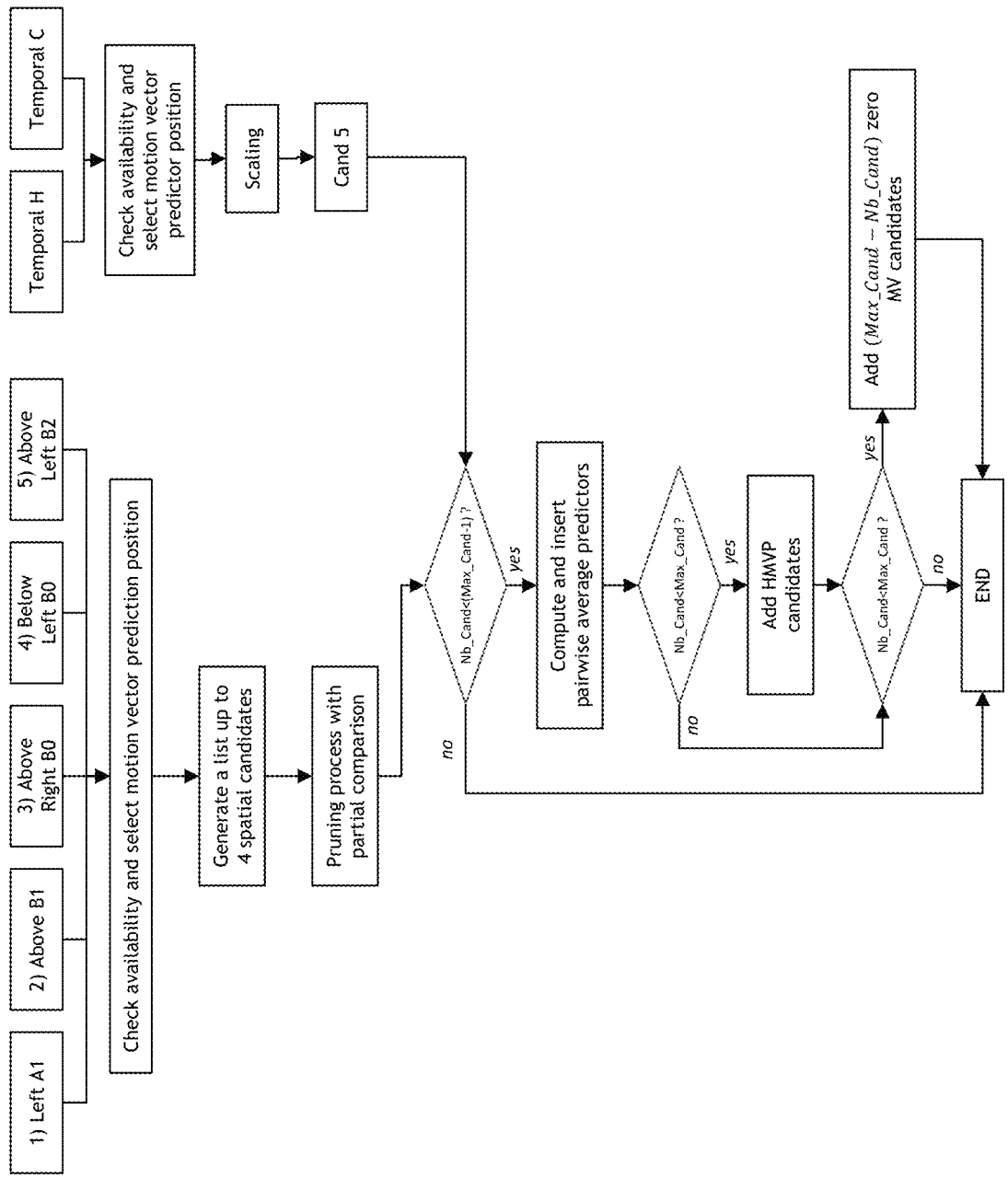
FIG. 14 illustrates a third variant of a first embodiment with a modified condition to insert pairwise average motion vector predictors.

According to another variant, shown in FIG. 14, the condition to insert pairwise average candidates is modified, so that pairwise candidates are used if at least two free places are remaining in the list. Otherwise, pairwise candidates are not considered.

According to a further embodiment, the ordering of the merge list between HMVP and pairwise candidates depends on the maximum allowed size for the merge list. Indeed, it has been observed that putting pairwise candidates before HMVP candidates improves coding efficiency when the maximum list size is 8. Otherwise, if it is 6, then no change in the coding efficiency is observed.

Therefore, it is proposed in this embodiment to make the order depend on the maximum list size. The maximum list size is coded as a slice or picture header parameter and is at most equal to 6 so far in VVC. In this embodiment, it is envisioned to allow the merge list size to be above 6, possibly up to 10.

Then, the order between HMVP and pairwise in the merge list is automatically decided as a function of the maximum merge list size. If it is higher or equal to a threshold (e.g., 8), then pairwise candidates are considered before HMVP in the merge list construction process. Otherwise, HMVP candidates are considered first, as is the case in VVC draft 3.

Figure 15:
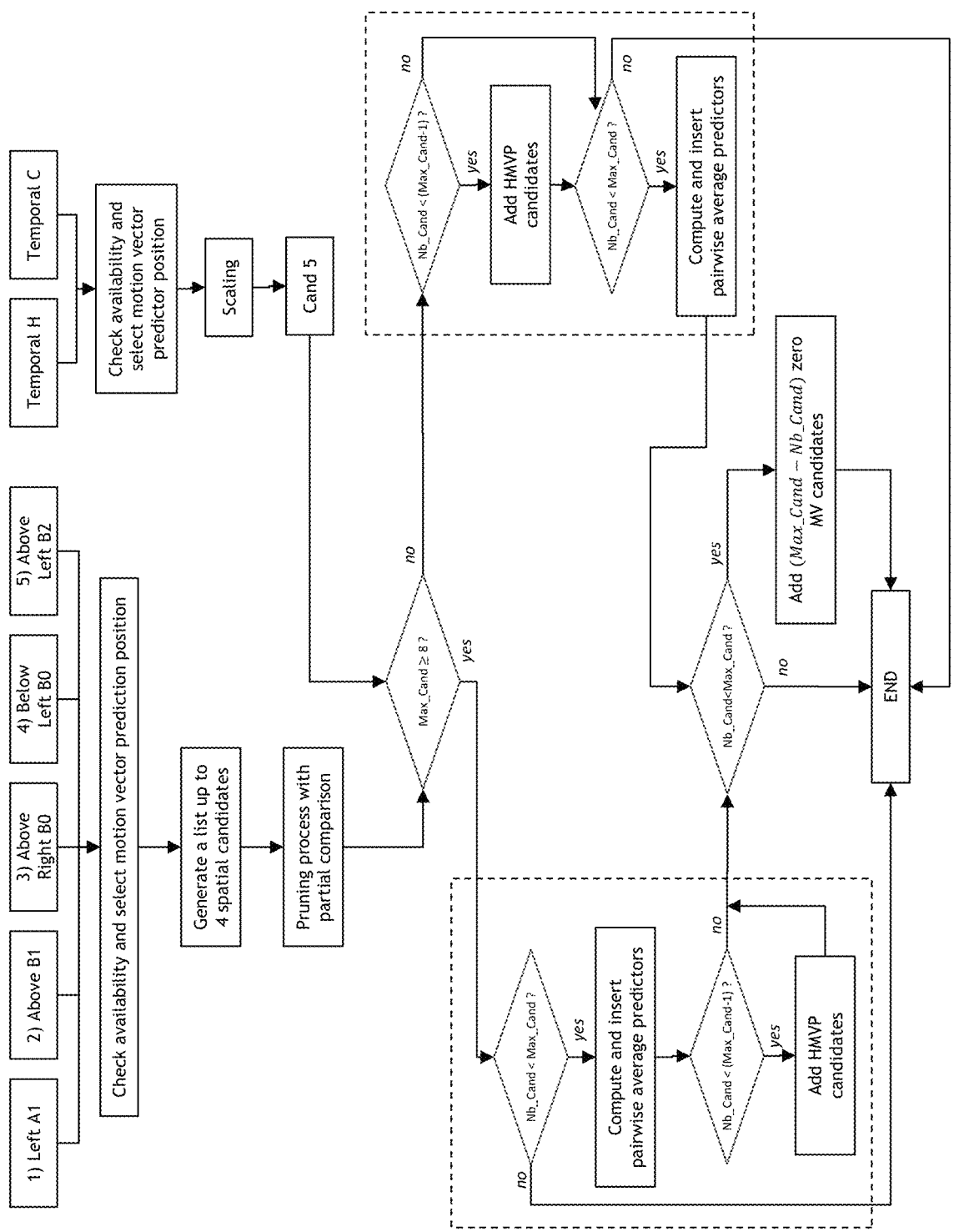
FIG. 15 illustrates a first variant of a second embodiment, wherein the order between pairwise and History-based Motion Vector Predictors during the candidate list construction dependents on the maximum list size.
Figure 16:
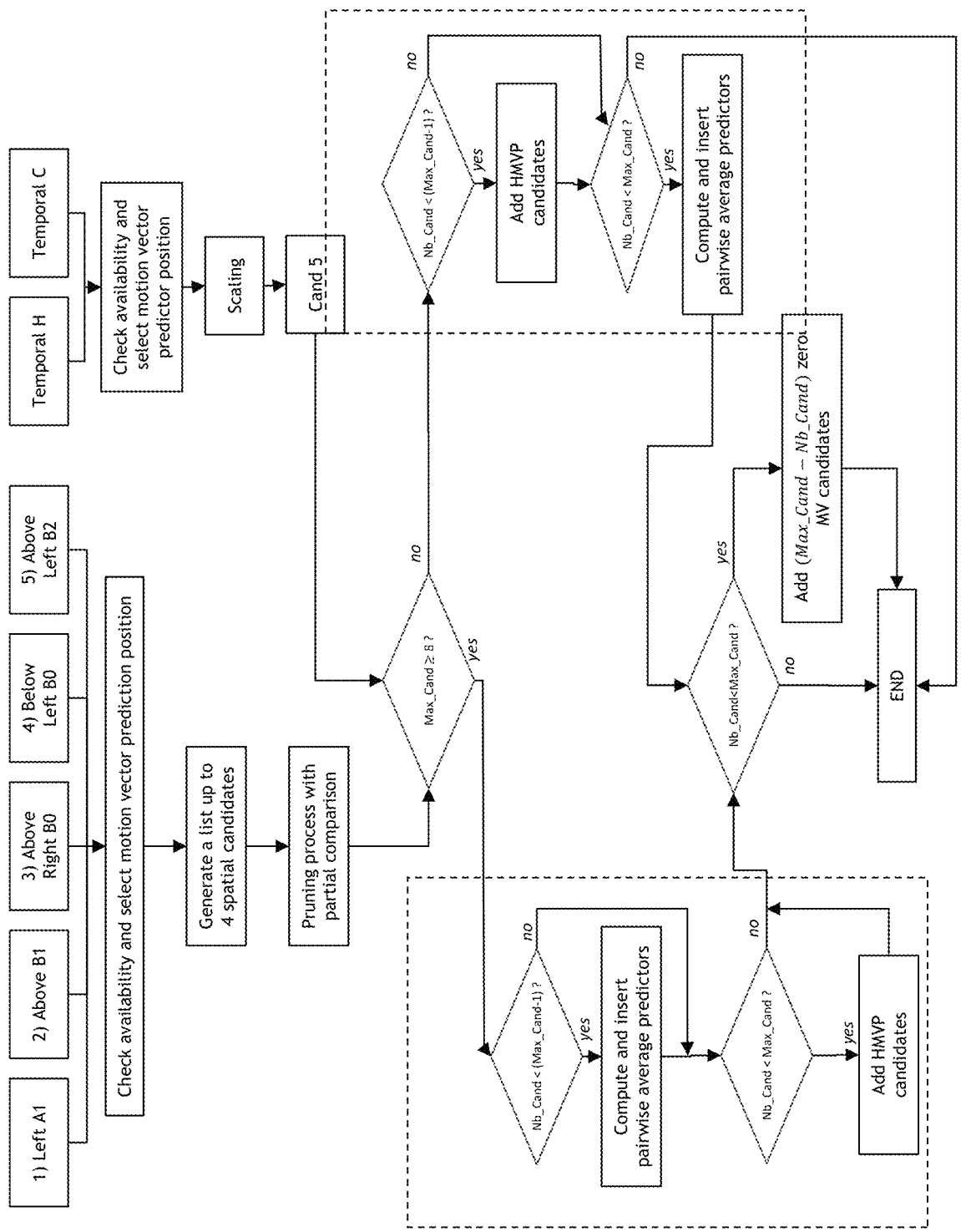
FIG. 16 illustrates a second variant of a second embodiment, wherein the conditions to consider HMVP candidates and pairwise candidates are modified as compared to the first variant.

The proposed embodiment is illustrated by the two variants of FIGS. 15 and 16. In the first variant shown in FIG. 15, the respective conditions to consider HMVP and pairwise candidates are unchanged compared to the VTM-3. This means HMVP candidates are processed if at least 2 free places are remaining in the merge list. Pairwise candidates are considered if the list is not full.

In the second variant shown in FIG. 16, the first considered type of candidates (according to the dynamically chosen order) are processed if at least two free places are remaining in the merge list under construction. The second type of candidates being processed in the chosen order are processed if the merge list is not yet full.

Figure 17:
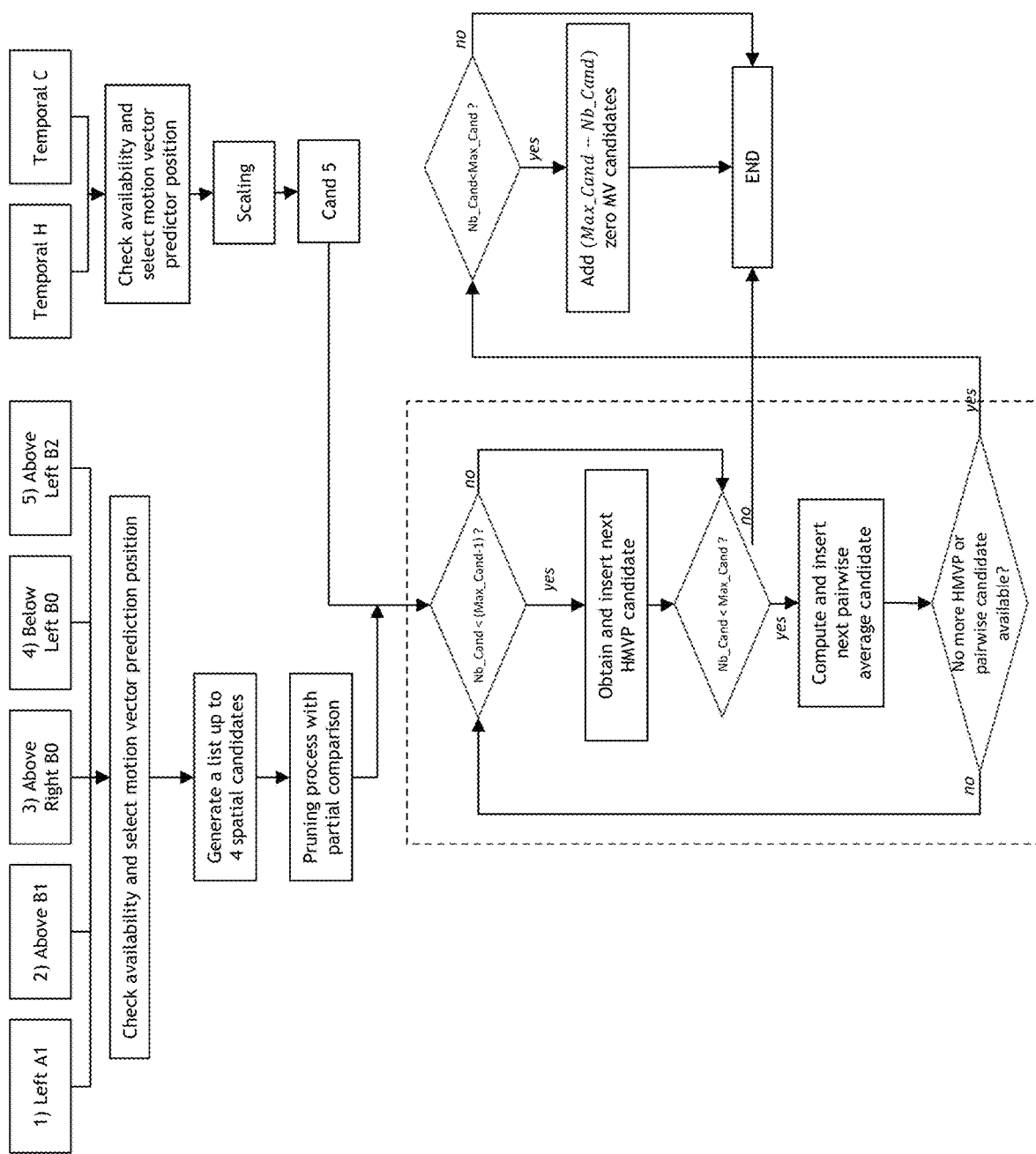
FIG. 17 illustrates a first variant of a third embodiment for the candidate list construction, wherein History-based Motion Vector Predictors and pairwise candidates are interleaved in the merge list.

According to a further embodiment, the HMVP and pairwise candidates are interleaved in the merge list. This is illustrated by FIG. 17. This new embodiment includes an iterative process, enclosed in dashed lines on FIG. 17. This loop consists in alternately inserting HMVP and pairwise candidates, until no more HMVP or pairwise candidate is available. During the loop, if no more HMVP candidate is available but some pairwise candidates are still available, then the loop continues until no more pairwise candidate is available. In the same way, during the loop, if no more pairwise candidate is available but some HMVP candidates are still available, then the loop continues until no more HMVP candidate is available.

Figure 18:
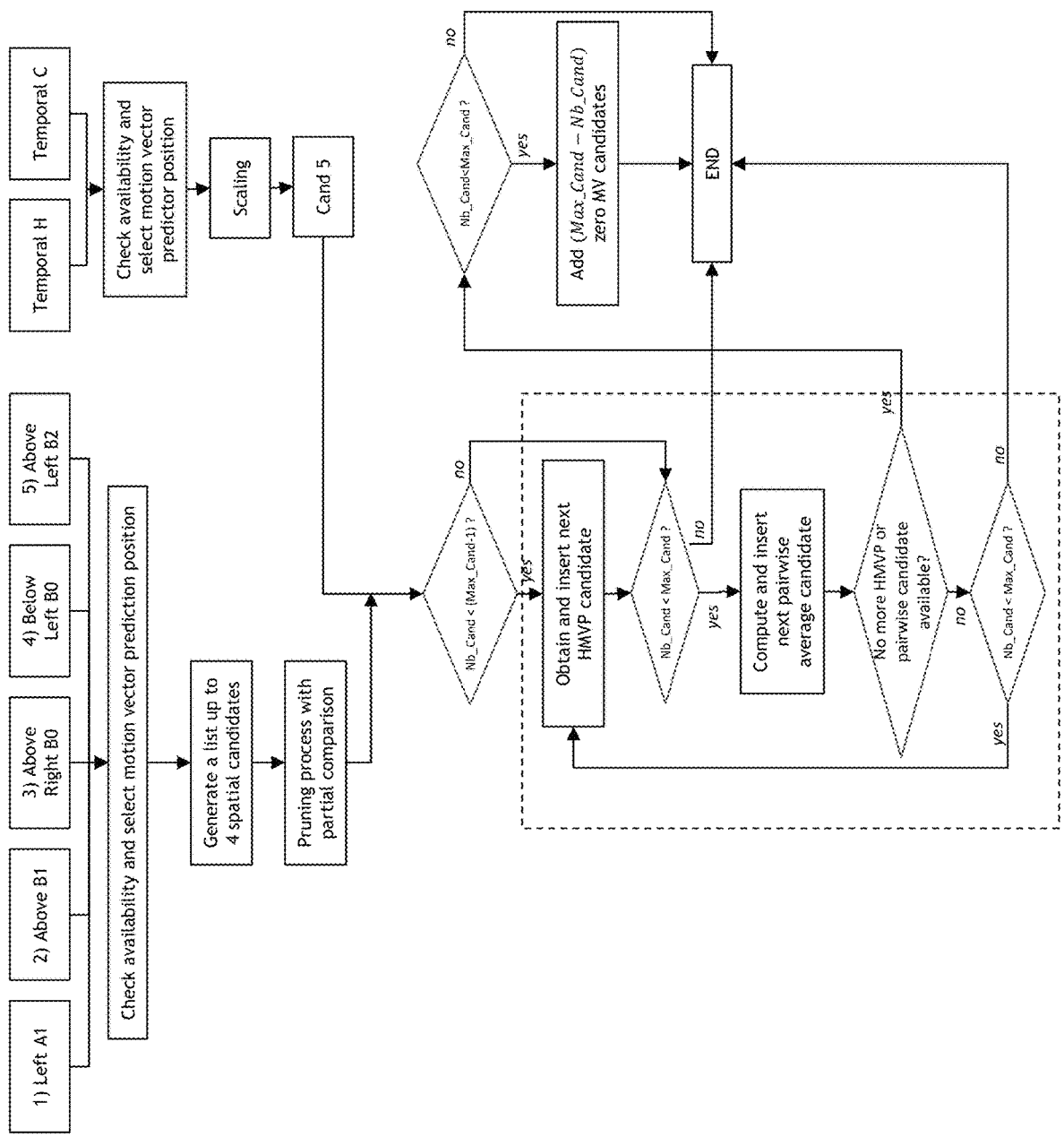
FIG. 18 illustrates a second variant of a third embodiment for the candidate list construction, wherein the conditions on the insertion of HMVP candidates are modified as compared to the first variant.

According to a variant of the present embodiment, the tests driven to check if an HMVP candidate has to be inserted into the merge list are modified, as shown in FIG. 18. For the first HMVP candidate to insert, the process tests if at least two free places are available in the list. If yes, the HMVP candidate is inserted, otherwise, the process considers the first pairwise candidate to insert instead. Next for the subsequent iterations, the same condition is used for the insertion of HMVP and pairwise candidates: these candidates are added to the list if the list is not yet full.

In JVET-L0090, it has been asserted that the gain of adding pairwise candidate is higher in Random Access configuration than in Low Delay configuration. HEVC combined candidates are more efficient in Low Delay than in Random Access configuration.

Figure 19:
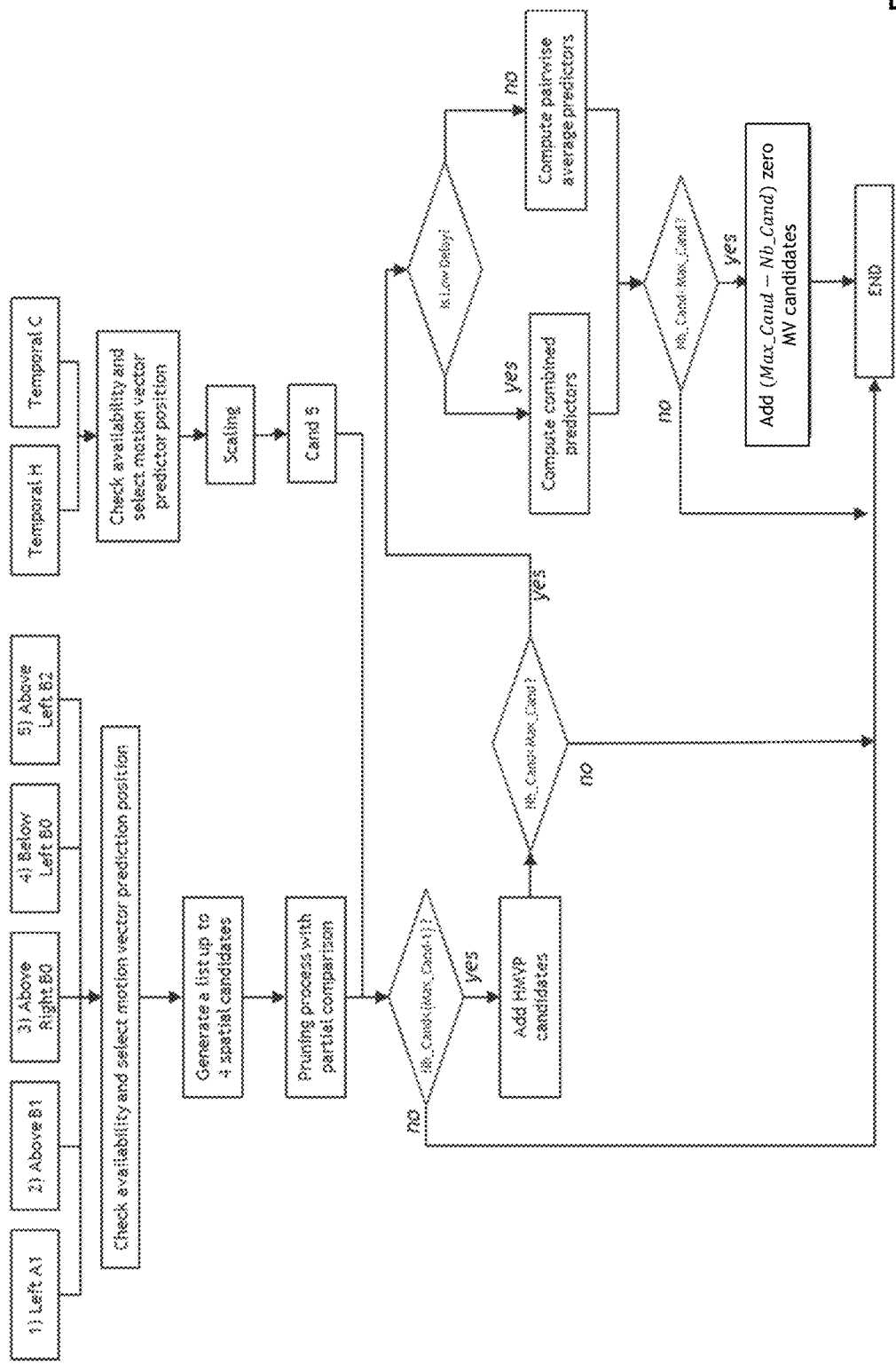
FIG. 19 illustrates a fourth embodiment for the candidate list construction, wherein Combined and Pairwise candidates are added depending on the temporal structure of the current frame.

According to the current embodiment, the merge candidate derivation process depends on the current temporal structure of reference frames. If all the reference frames have a Picture Order Count (POC) smaller than the current POC, i.e. the reference frames are in the past, the current frame is considered having a Low Delay (LD) configuration. If some reference frames are in the past, other are in the future, the current frame is considered having a Random Access (RA) configuration. In the current embodiment, if the current picture has a Random Access configuration, Pairwise candidates are added, and if the current picture has a Low Delay configuration, combined candidates are added, as depicted in FIG. 19.

In a variant of the embodiment, the HMVP insertion position depends on the Low Delay configuration.

According to another embodiment, the ordering between HMVP and pairwise average candidates in the list is derived according to the rate of usage of these two respective candidates in past coding units. JVET-L0318 (see JVET-L0318 "CE4: ranking based spatial merge candidate list for inter prediction (Test CE4.4.14)", G. Li, X. Xu, X. Li, S. Liu (Tencent), Macao, October 2018) proposes a ranking based spatial merge candidate list for inter prediction. Here a similar approach is applied to the ranking between HMVP and pairwise in the translational merge candidate list. Therefore, a rate of usage, respectively of HMVP and pairwise is maintained as long as coding units are being decoded or encoded. Then, the mode with the higher number of occurrences is put first in the list.

Figure 20:
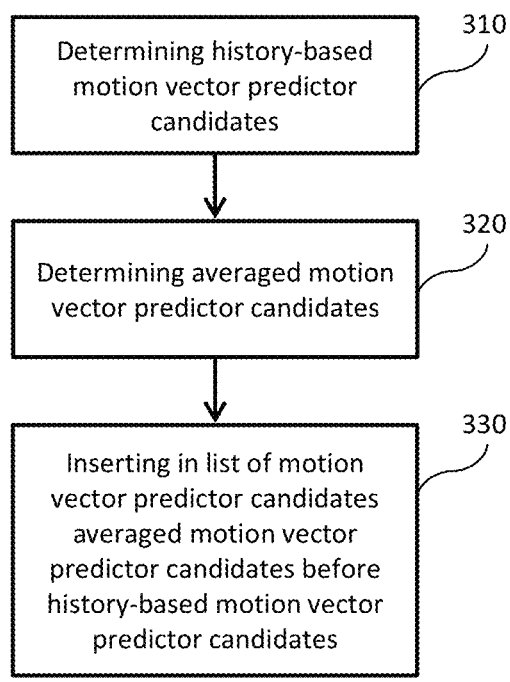
FIG. 20 illustrates a generic flowchart for a method according to an embodiment of the present disclosure.

The various proposed embodiments provide merge lists comprising HMVP and pairwise candidates in a rate distortion efficient way. A generic flowchart 300 showing the common basic principle of these embodiments is illustrated in FIG. 20. For a current block of a picture one or more history-based motion vector predictor candidates are determined in step 310 using motion information of blocks preceding the current block. Furthermore, in step 320 one or more averaged motion vector predictor candidates are determined for the current block by averaging a pair of motion vector predictor candidates in a list of motion vector predictor candidates, wherein the motion vector predictor candidates in the list are formed using motion information of blocks spatially and/or temporally surrounding the current block. Finally, one or more of the averaged motion vector predictor candidates are inserted before one or more of the history-based motion vector predictor candidates in the list of motion vector predictor candidates.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 21:
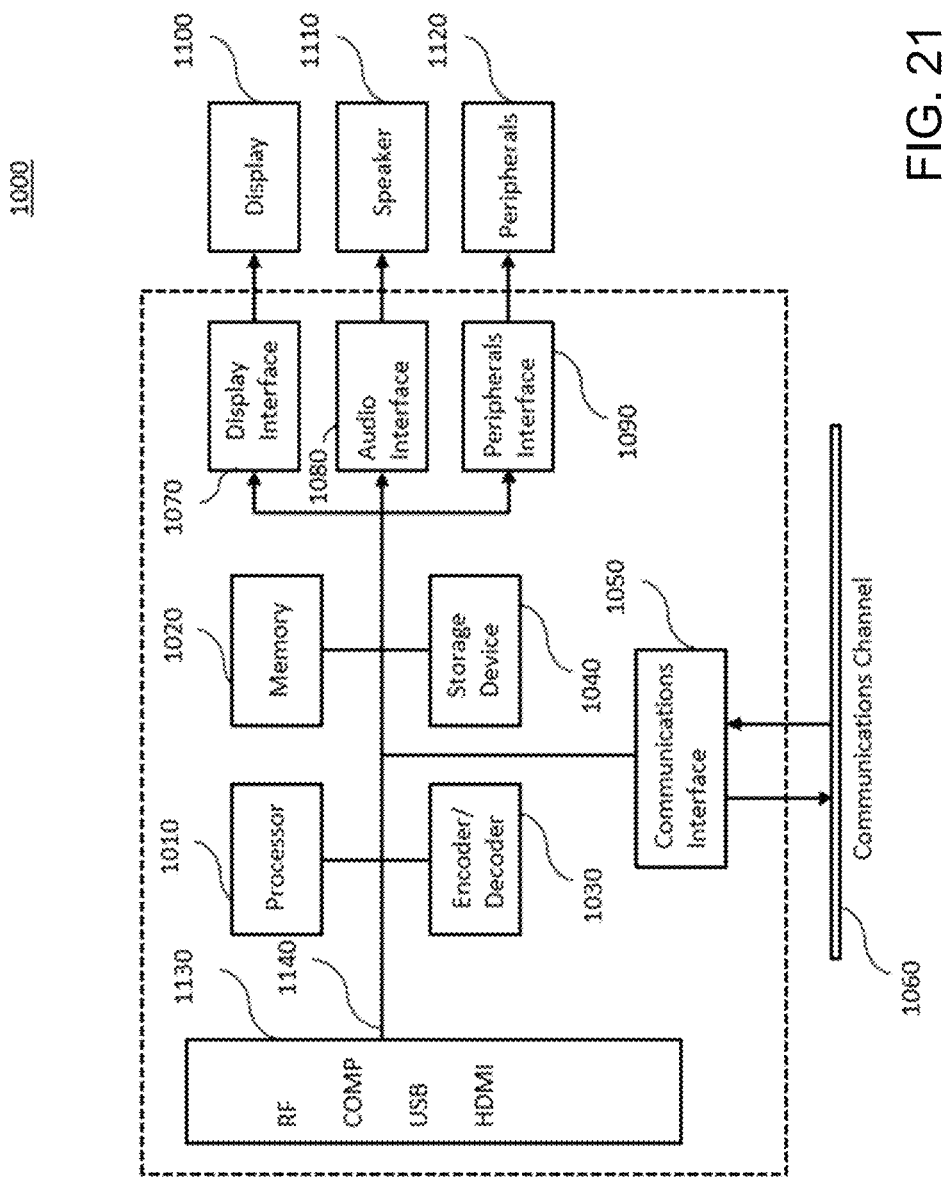
FIG. 21 illustrates a block diagram of an example of a system in which various aspects of the exemplary embodiments may be implemented.

The aspects described and contemplated in this application can be implemented in many different forms. FIGS. 1, 2 and 21 below provide some embodiments, but other embodiments are contemplated and the discussion of FIGS. 1, 2 and 21 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the entropy coding, and/or decoding modules (170, 175, 275), of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of spots left in the merge candidate list, and the threshold for the maximum allowable size of the merge candidate list. The specific values are for example purposes and the aspects described are not limited to these specific values.

FIG. 21 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 21, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other devices. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The invention claimed is:

1. A method for encoding a picture, comprising:
   determining for a current block of the picture one or more history-based motion vector predictor candidates using motion information of blocks preceding the current block, wherein said one or more history-based motion vector predictor candidates are maintained in a table according to a first-in-first-out rule;
   determining for the current block one or more averaged motion vector predictor candidates by averaging a pair of motion vector predictor candidates in a list of motion vector predictor candidates, wherein the motion vector predictor candidates in the list are formed using motion information of at least one or more of blocks spatially and temporally surrounding the current block;
   obtaining a maximum list size for the list of motion vector predictor candidates, wherein ordering between history-based motion vector predictor candidates and averaged motion vector predictor candidates in the list of motion vector predictor candidates depends on the maximum list size for the list of motion vector predictor candidates; and
   responsive to the maximum list size being greater than or equal to a predefined value, inserting all averaged motion vector predictor candidates before all history-based motion vector predictor candidates in the list of motion vector predictor candidates.

2. The method of claim 1, wherein history-based motion vector predictor candidates are inserted in the list of motion vector predictor candidates if any free place remains in the list after inserting the averaged motion vector predictor candidates.

3. The method of claim 1, wherein the averaged motion vector predictor candidates are inserted only in the list of motion vector predictor candidates if at least two free places are available in the list.

4. The method of claim 1, wherein for a maximum list size being smaller than the predefined value the averaged motion vector predictor candidates are inserted after the history-based motion vector predictor candidates in the list of motion vector predictor candidates.

5. The method of claim 1, wherein the maximum list size is coded as a slice or picture header parameter.

6. An apparatus for encoding a picture, comprising one or more processors, wherein said one or more processors are configured to:
   determine for a current block of the picture one or more history-based motion vector predictor candidates using motion information of blocks preceding the current block, wherein said one or more history-based motion vector predictor candidates are maintained in a table according to a first-in-first-out rule;
   determine for the current block one or more averaged motion vector predictor candidates by averaging a pair of motion vector predictor candidates in a list of motion vector predictor candidates, wherein the motion vector predictor candidates in the list are formed using motion information of at least one or more of blocks spatially and temporally surrounding the current block;
   obtain a maximum list size for the list of motion vector predictor candidates, wherein ordering between history-based motion vector predictor candidates and averaged motion vector predictor candidates in the list of motion vector predictor candidates depends on the maximum list size for the list of motion vector predictor candidates; and
   responsive to the maximum list size being greater than or equal to a predefined value, insert all averaged motion vector predictor candidates before all history-based motion vector predictor candidates in the list of motion vector predictor candidates.

7. The apparatus of claim 3, wherein the averaged motion vector predictor candidates are inserted only in the list of motion vector predictor candidates if at least two free places are available in the list.

8. The apparatus of claim 6, wherein for a maximum list size being smaller than the predefined value the averaged motion vector predictor candidates are inserted after the history-based motion vector predictor candidates in the list of motion vector predictor candidates.

9. The apparatus of claim 6, wherein the maximum list size is coded as a slice or picture header parameter.

10. The apparatus of claim 6, wherein history-based motion vector predictor candidates are inserted in the list of motion vector predictor candidates if at least two free places remain in the list after inserting the averaged motion vector predictor candidates.

11. A non-transitory computer readable storage medium having stored thereon instructions for video encoding according to the method of claim 1.

12. A method for decoding a picture, comprising:
determining for a current block of the picture one or more history-based motion vector predictor candidates using motion information of blocks preceding the current block, wherein said one or more history-based motion vector predictor candidates are maintained in a table according to a first-in-first-out rule;
determining for the current block one or more averaged motion vector predictor candidates by averaging a pair of motion vector predictor candidates in a list of motion vector predictor candidates, wherein the motion vector predictor candidates in the list are formed using motion information of at least one or more of blocks spatially and temporally surrounding the current block;
obtaining a maximum list size for the list of motion vector predictor candidates, wherein ordering between history-based motion vector predictor candidates and averaged motion vector predictor candidates in the list of motion vector predictor candidates depends on the maximum list size for the list of motion vector predictor candidates; and
responsive to the maximum list size being greater than or equal to a predefined value, inserting all averaged motion vector predictor candidates before all history-based motion vector predictor candidates in the list of motion vector predictor candidates.

13. The method of claim 12, wherein the averaged motion vector predictor candidates are inserted only in the list of motion vector predictor candidates if at least two free places are available in the list.

14. The method of claim 12, wherein for a maximum list size being smaller than the predefined value the averaged motion vector predictor candidates are inserted after the history-based motion vector predictor candidates in the list of motion vector predictor candidates.

15. The method of claim 12, wherein the maximum list size is coded as a slice or picture header parameter.

16. A non-transitory computer readable storage medium having stored thereon instructions for video decoding according to the method of claim 12.

17. An apparatus for decoding a picture, comprising one or more processors, wherein said one or more processors are configured to:
determine for a current block of the picture one or more history-based motion vector predictor candidates using motion information of blocks preceding the current block, wherein said one or more history-based motion vector predictor candidates are maintained in a table according to a first-in-first-out rule;
determine for the current block one or more averaged motion vector predictor candidates by averaging a pair of motion vector predictor candidates in a list of motion vector predictor candidates, wherein the motion vector predictor candidates in the list are formed using motion information of at least one or more of blocks spatially and temporally surrounding the current block;
obtain a maximum list size for the list of motion vector predictor candidates, wherein ordering between history-based motion vector predictor candidates and averaged motion vector predictor candidates in the list of motion vector predictor candidates depends on the maximum list size for the list of motion vector predictor candidates; and
responsive to the maximum list size being greater than or equal to a predefined value, insert all averaged motion vector predictor candidates before all history-based motion vector predictor candidates in the list of motion vector predictor candidates.

18. The apparatus of claim 17, wherein for a maximum list size being smaller than the predefined value the averaged motion vector predictor candidates are inserted after the history-based motion vector predictor candidates in the list of motion vector predictor candidates.

19. The apparatus of claim 17, wherein the maximum list size is coded as a slice or picture header parameter.

20. The apparatus of claim 17, wherein history-based motion vector predictor candidates are inserted in the list of motion vector predictor candidates if at least two free places remain in the list after inserting the averaged motion vector predictor candidates.

* * * * *